(12) United States Patent
Rizzo, Jr. et al.

(10) Patent No.: US 10,132,167 B2
(45) Date of Patent: Nov. 20, 2018

(54) METHODS FOR CREATING A FILM COOLED ARTICLE FOR A GAS TURBINE ENGINE

(71) Applicant: United Technologies Corporation, Hartford, CT (US)

(72) Inventors: John P. Rizzo, Jr., Vernon, CT (US); Alan C. Barron, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 433 days.

(21) Appl. No.: 14/740,309

(22) Filed: Jun. 16, 2015

(65) Prior Publication Data

US 2015/0361799 A1   Dec. 17, 2015

Related U.S. Application Data

(60) Provisional application No. 62/012,594, filed on Jun. 16, 2014.

(51) Int. Cl.
| | |
|---|---|
| *F01D 5/18* | (2006.01) |
| *B23P 15/02* | (2006.01) |
| *B23Q 15/013* | (2006.01) |
| *G05B 15/02* | (2006.01) |

(52) U.S. Cl.
CPC ............. *F01D 5/186* (2013.01); *B23P 15/02* (2013.01); *B23Q 15/013* (2013.01); *G05B 15/02* (2013.01); *B23P 2700/06* (2013.01); *F05D 2230/14* (2013.01); *F05D 2260/202* (2013.01); *Y02T 50/676* (2013.01); *Y10T 29/38* (2015.01); *Y10T 29/49318* (2015.01)

(58) Field of Classification Search
CPC ............... F01D 5/186; F05D 2260/202; F05D 2230/14; G05B 15/02; B23Q 15/013; B23Q 17/0952–17/099; B23Q 17/22–17/2495; B23P 15/02; B23P 2700/06; Y10T 29/38; Y10T 29/49318; Y10T 409/303752; Y10T 409/303808; Y02T 50/676; B23C 2215/44; B23C 2215/04; B24B 49/10; B24B 49/12
See application file for complete search history.

(56) References Cited

U.S. PATENT DOCUMENTS

| | | |
|---|---|---|
| 3,995,422 A | 12/1976 | Stamm |
| 4,197,443 A | 4/1980 | Sidenstick |
| 5,669,991 A | 9/1997 | DeFilippo |
| 6,243,948 B1 | 6/2001 | Lee et al. |
| 6,339,879 B1 | 1/2002 | Wheat et al. |

(Continued)

*Primary Examiner* — Sarang Afzali
(74) *Attorney, Agent, or Firm* — Carlson, Gaskey & Olds, P.C.

(57) ABSTRACT

A method for finishing a film cooled article includes providing a film cooled article including at least one inner cooling plenum and at least one opening connecting the inner cooling plenum to an exterior surface of the film cooled article, positioning a machining element in contact with the exterior surface of the film cooled article, automatically moving the machining element along the exterior surface while maintaining contact between the machining tool and the surface, identifying an actual position of at least one film opening based on sensory feedback from the machining element using a controller, removing material from the exterior surface at the at least one film opening using the machining element, thereby creating a depression at the at least one film opening.

10 Claims, 4 Drawing Sheets

(56) References Cited

U.S. PATENT DOCUMENTS

| | | | |
|---|---|---|---|
| 6,411,861 B1 * | 6/2002 | Clewes | B24B 5/42 |
| | | | 451/11 |
| 6,606,541 B2 * | 8/2003 | Vaidyanathan | B23P 6/002 |
| | | | 29/889.7 |
| 6,912,446 B2 * | 6/2005 | Wang | B23P 6/002 |
| | | | 29/889.1 |
| 7,220,934 B2 | 5/2007 | Paauwe et al. | |
| 8,245,519 B1 | 8/2012 | Liang | |
| 8,742,279 B2 | 6/2014 | Gannelli et al. | |
| 9,383,742 B2 * | 7/2016 | Li | G05B 19/404 |
| 2013/0001203 A1 * | 1/2013 | Mironets | B23H 1/02 |
| | | | 219/69.13 |
| 2013/0115103 A1 | 5/2013 | Dutta et al. | |

* cited by examiner

METHODS FOR CREATING A FILM COOLED ARTICLE FOR A GAS TURBINE ENGINE

CROSS-REFERENCE TO RELATED APPLICATION

This application claims priority to United States Provisional Application No. 62/012594 filed Jun. 16, 2014.

TECHNICAL FIELD

The present disclosure relates generally to film cooled articles for gas turbine engines, and more particularly to a method for creating a film cooled article.

BACKGROUND

Gas turbines include a compressor section that compresses air and feeds the compressed air to a combustor through a primary flowpath. Compressed air is mixed with fuel in the combustor and ignited, creating combustion gasses. The combustion gasses are expelled from the combustor through a turbine section, along the primary flowpath. As the combustion gasses pass through the turbine section, each stage of the turbine section is driven to rotate by the combustion gasses. Each stage is connected to a central shaft, and the rotation of the turbine stage is transferred to the shaft, thereby driving the shaft to rotate. In some implementations, such as a geared turbofan (GTF) engine, the rotation of the shaft drives a fan. In other gas turbine implementations, such as a land based turbine, the rotation of the shaft is output to an electrical generator, or another system requiring a rotational input.

To facilitate turbine operation, gas turbines include one or more turbine stages, with each stage having multiple blades arranged circumferentially in the flowpath at a single axial position. Each blade is paired with a corresponding vane. Due to the extreme temperatures of the combustion gasses, it is common practice to cool the blades and vanes to improve their ability to endure extended exposure to the hot combustion gasses. In some examples, relatively cool pressurized air is provided from elsewhere in the engine to the blades and vanes and operates as a coolant. In such an example, the blades are referred to as film cooled articles.

SUMMARY OF THE INVENTION

A method for finishing a film cooled article according to an example of the present disclosure includes providing a film cooled article including at least one inner cooling plenum and at least one opening connecting the inner cooling plenum to an exterior surface of the film cooled article, positioning a machining element in contact with the exterior surface of the film cooled article, automatically moving the machining element along the exterior surface while maintaining contact between the machining tool and the surface, identifying an actual position of at least one film opening based on sensory feedback from the machining element using a controller, removing material from the exterior surface at the at least one film opening using the machining element, thereby creating a depression at the at least one film opening.

In a further embodiment of any of the foregoing embodiments, the film cooled article is a cast film cooled article.

In a further embodiment of any of the foregoing embodiments, identifying the actual position of the at least one film opening based on sensory feedback from the machining element comprises interpreting sensor readings from at least one of a touch sensor apparatus and a visual sensor apparatus using the controller.

In a further embodiment of any of the foregoing embodiments, identifying the actual position of the at least one film opening based on sensory feedback from the machining element comprises the controller interpreting sensor readings from a combination of a touch sensor apparatus and a visual sensor apparatus.

In a further embodiment of any of the foregoing embodiments, identifying the actual position of the at least one film opening based on sensory feedback from the machining element, and removing material from the exterior surface at the film opening using the machining element, thereby creating a depression at the film opening is repeated for each film opening of the film cooled article.

In a further embodiment of any of the foregoing embodiments, identifying the actual position of the at least one film opening based on sensory feedback from the machining element, and removing material from the exterior surface at the film opening using the machining element, thereby creating a depression at the film opening is repeated for a subset of a plurality film openings of the film cooled article.

In a further embodiment of any of the foregoing embodiments, removing material from the exterior surface at the film opening using the machining element, thereby creating a depression at the film opening comprises removing material only at the film openings.

In a further embodiment of any of the foregoing embodiments, identifying an actual position of at least one film opening based on sensory feedback from the machining element is performed by the controller in real time as the machining element is moved along the exterior surface.

A further embodiment of any of the foregoing embodiments includes automatically moving the machining element along the exterior surface while maintaining contact between the machining tool and the surface comprises moving the machining element to an expected position of at least one film opening.

In a further embodiment of any of the foregoing embodiments, identifying an actual position of at least one film opening based on sensory feedback from the machining element using a controller comprises identifying the expected position and identifying the actual position relative to the expected position.

In a further embodiment of any of the foregoing embodiments, removing material from the exterior surface at the film opening using the machining element, thereby creating a depression at the film opening comprises creating a depression only at the film opening.

A finishing apparatus for a film cooled article according to an example of the present disclosure includes a central control machine including a computerized controller, at least one articulating device controlled by the central control machine, a machining tool mounted to the articulating device, such that the articulating device is operable to move the machining tool, at least one of a touch sensor apparatus and a visual sensor apparatus mounted to the machining tool and communicatively coupled to the computerized controller, and wherein the computerized controller stores instructions operable to cause the finishing apparatus to perform the steps of positioning a machining element in contact with an exterior surface of a film cooled article, automatically moving the machining element along the exterior surface while maintaining contact between the machining tool and the surface, identifying an actual position of at least one film opening based on sensory feedback from the machining element using a controller, and removing material from the exterior surface at the film opening using the machining element, thereby creating a depression at the at least one film opening.

In a further embodiment of any of the foregoing embodiments, the at least one of a touch sensor apparatus and a visual sensor apparatus comprises both a touch sensor apparatus and a visual sensor apparatus.

In a further embodiment of any of the foregoing embodiments, the computerized controller further comprises a memory storing expected film opening locations.

In a further embodiment of any of the foregoing embodiments, the at least one film opening is at least one of a film hole and a film slot.

In a further embodiment of any of the foregoing embodiments, the touch sensor comprises at least one of a pressure based touch sensor, capacitive based touch sensor, and a resistive based touch sensor.

A film cooled article for a gas turbine according to an example of the present disclosure includes an article body having an internal cooling plenum operable to receive coolant and an exterior surface, at least one film opening connecting the internal plenum to the exterior surface and operable to allow coolant from the internal plenum to be ejected from the film cooled article, and at least one depression aligned with the at least one film opening, wherein the depression does not extend beyond the film opening in at least one direction.

In a further embodiment of any of the foregoing embodiments, the at least one film opening comprises a plurality of film holes, and wherein the at least one depression comprises a plurality of depressions with each depression corresponding to one of the film holes.

In a further embodiment of any of the foregoing embodiments, the at least one depression includes a descending flank fore of the film opening and an ascending flank at least partially aft of the film opening, relative to an expected fluid flow direction.

In a further embodiment of any of the foregoing embodiments, the film opening is at least partially positioned on the ascending flank.

These and other features of the present invention can be best understood from the following specification and drawings, the following of which is a brief description.

DETAILED DESCRIPTION OF AN EMBODIMENT

Figure 1:
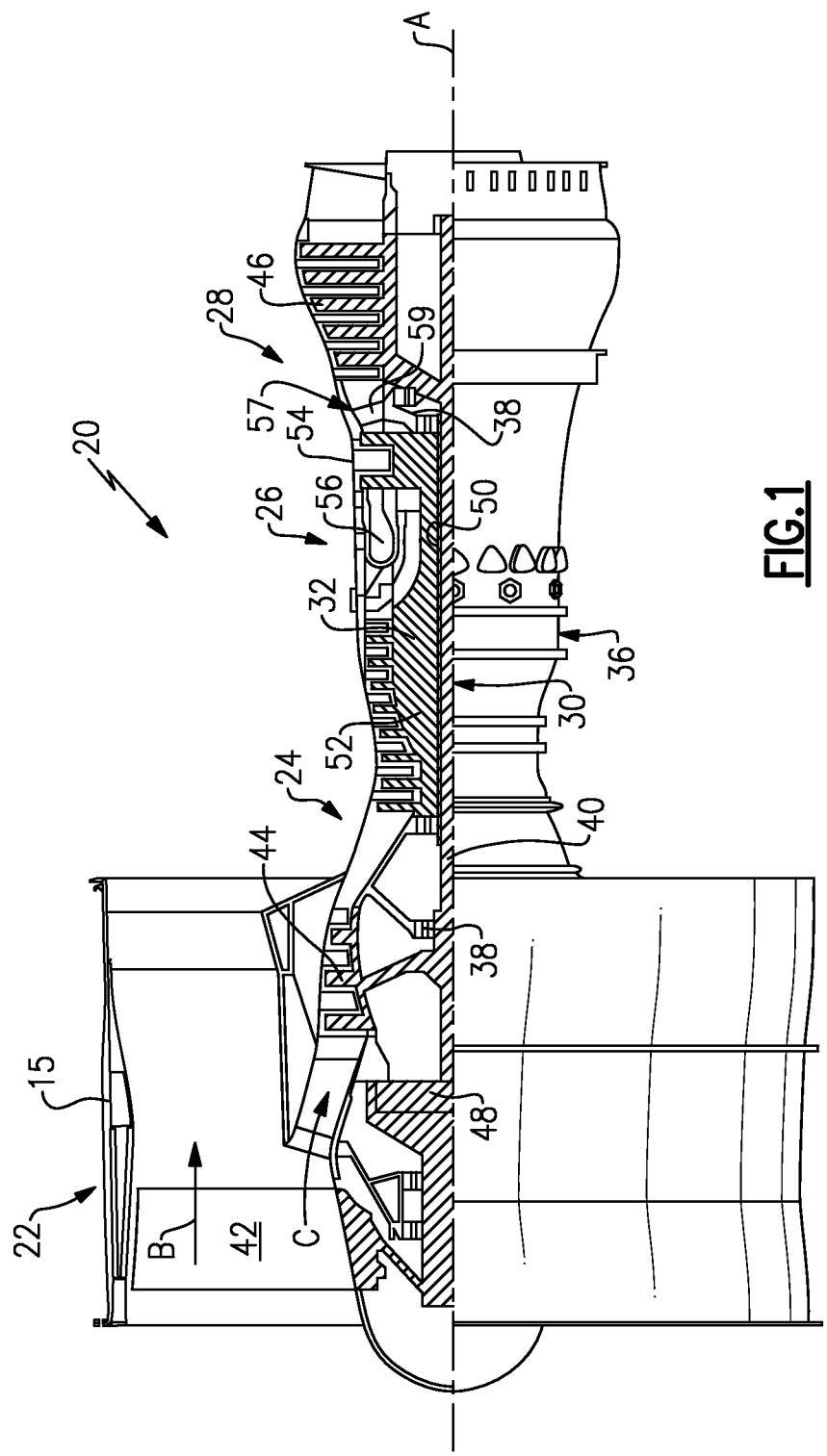
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^0.5$. The "Low corrected fan tip speed" as disclosed herein according to one non-limiting embodiment is less than about 1150 ft/second.

The turbine section 28 includes multiple stages, with each stage having multiple circumferentially spaced blades at a single axial position. Each of the blades is paired with a corresponding vane. In order to prevent overheating of the turbine blades, a film cooling system is implemented within each turbine blade. Similar film cooling systems can be implemented in the corresponding vane, or in other similar components. Each film cooled component is referred to as a film cooled article.

In general, the airfoil of a film cooled blade or vane includes an internal plenum and one or more rows of obliquely oriented, spanwisely distributed coolant supply holes, referred to as film holes. In alternate examples, the film holes can be replaced with slots. The film holes penetrate the walls of an airfoil to establish fluid flow communication between the plenum and the flowpath. During engine operation, the plenum receives coolant from the compressor and distributes it to the film holes. The coolant issues from the holes as a series of discrete jets. The oblique orientation of the film holes causes the coolant jets to enter the flowpath with a streamwise directional component, i.e. a component parallel to and in the same direction as the dominant flow direction of the combustion gases. Ideally, the jets spread out laterally, i.e. spanwisely, to form a laterally continuous, flowing coolant film that hugs or adheres to the flowpath exposed surface of the airfoil. Multiple, rows of film holes are used in some examples, because the coolant film loses effectiveness as it flows along the airfoil surface.

The supply pressure of the coolant in the internal plenum exceeds the static pressure of the combustion gases flowing through the flowpath. If the static pressure is not exceeded, the quantity of coolant flowing through the film holes is inadequate to satisfactorily film cool the airfoil surfaces. When the static pressure of the combustion gases exceeds the coolant supply pressure, ingestion of harmful combustion gases into the plenum by way of the film holes can occur. This is referred to as backflow. The intense heat of the ingested combustion gases can quickly and irreparably damage a blade or vane subjected to backflow. However, the high coolant pressures required to guard against inadequate coolant flow and backflow can cause the coolant jets to penetrate into the flowpath rather than adhere to the surface of the airfoil. As a result, a zone of the airfoil surface immediately downstream of each film hole becomes exposed to the combustion gases.

Each of the highly cohesive coolant jets that penetrate into the flowpath locally bifurcates the stream of combustion gases into a pair of minute, oppositely swirling vortices. The vertically flowing combustion gases enter the exposed zone immediately downstream of the coolant jets. Thus, the high pressure coolant jets not only leave part the airfoil surface exposed, but actually entrain the hot, damaging gases into the exposed zone. In addition, the cohesiveness of the jets impedes their ability to spread out laterally (i.e. in the spanwise direction) and coalesce into a spanwisely continuous film. As a result, strips of the airfoil surface spanwisely intermediate the film holes remain unprotected from the hot gases.

One way to encourage the coolant jets to adhere to the surface is to orient the film holes at a shallow angle relative to the surface. With the holes so oriented, the coolant jets will enter the flowpath in a direction more parallel than perpendicular to the surface.

Figures 2A, 2B:
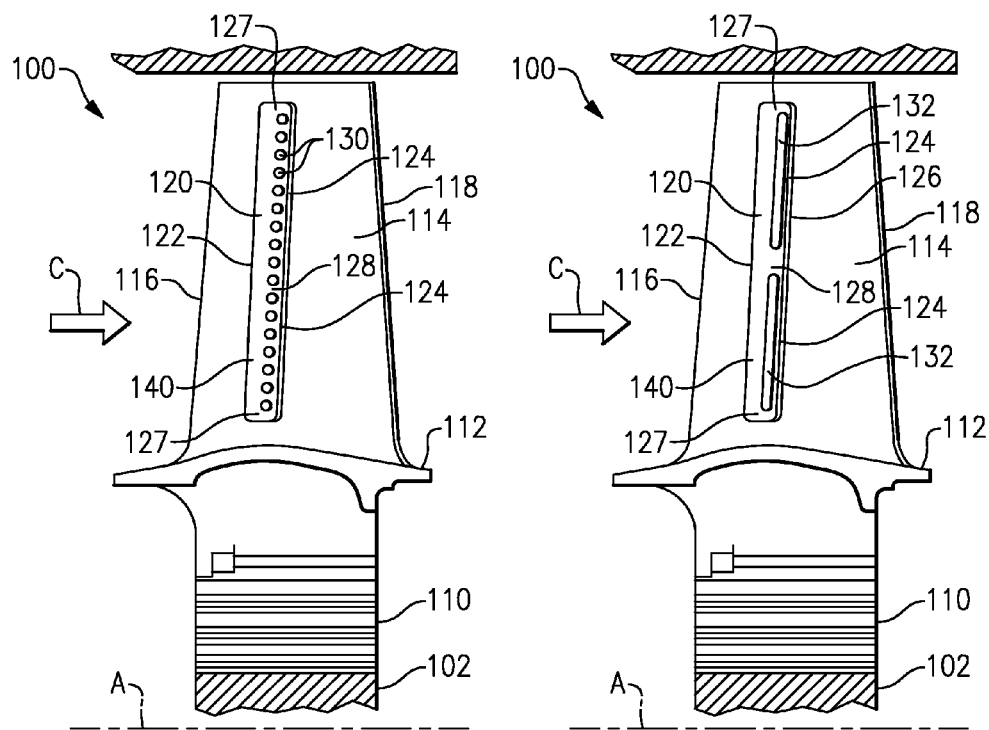
FIG. 2A schematically illustrates a first film cooled blade.
FIG. 2B schematically illustrates a second film cooled blade.

FIGS. 2A and 2B illustrate detailed example turbine stage blades 100, including the film cooling system described generally above. Each of the blades 100 includes a root portion 110, a platform 112 and an airfoil 114. The airfoil 114 includes a leading edge 116 and a trailing edge 118. The airfoil 114 extends into the primary flowpath C, with the leading edge 116 upstream of the trailing edge 118. Each blade 100 includes one or more internal plenums (not pictured) that receives coolant from a coolant source such as a compressor bleed. In a fully assembled turbine engine, such as the gas turbine engine 20, multiple circumferentially distributed blades 100 radiate from a rotatable hub 102, with each blade root portion 110 being captured in a corresponding slot in the hub 102.

During operation of the gas turbine engine 20, fluid in the primary flowpath C is comprised of hot gaseous combustion products and flows over the outer surfaces of the airfoil 114. The fluid flow over the airfoils 114 exert forces on the airfoil 114, thereby driving the hub 102 to rotate.

The walls of the airfoil 114 each have a cold side with relatively cool internal surfaces in contact with the coolant plenum. Each wall also includes an external surface that is hot relative to the internal surface. The external surfaces are the surfaces exposed to the fluid flowing through the primary flowpath C. The hot surface includes a depression 120 in the form of a trough. In alternate examples, the depression 120 can be multiple individual dimples or multiple troughs. While illustrated herein as a trough extending substantially linearly in the spanwise direction of the airfoil 114, other trough configurations can be implemented including non-linear troughs. The depression 120 includes a descending flank 122 fore of film holes 130 or slots 132 and an ascending flank 124 aft of the film holes 130 or slots 132. The relative sizes of the depression 120, film holes 130, film slots 132, and the airfoil 114 are drawn for illustrative effect and are not drawn to scale.

A gently contoured ridge 126 may border the aft end of the depression 120. The ridge 126 rises above, and then blends into a conventional airfoil contour of the exterior surface of the airfoil 114. A floor 140, which is neither descending nor ascending, joins the flanks 122, 124. In the illustrated embodiment, the floor 140 is merely the juncture between the descending and ascending flanks 122, 124, however the floor 140 may have a finite length.

Disposed within the depression 120 are multiple film holes 130 (FIG. 2A) or one or more film slots 132 (FIG. 2B)

that provide a fluid pathway between the interior plenums of the airfoil 114 and the flowpath C in which the airfoil 114 is disposed. The film holes 130 or slots 132 penetrate the wall to convey coolant from the cold side to the hot side. Each film hole 130 or slot 132 has an intake opening on the internal surface of the penetrated wall and a discharge opening in the form of an orifice on the external surface of the penetrated wall. Each discharge opening is disposed on the ascending flank 124 of the depression 120. The film holes 130 or slots 132 are oriented so that coolant jets discharged from the film holes 130 or slots 132 enter the primary flowpath C with a streamwise directional component, rather than with a counter-streamwise component. The streamwise directional component helps ensure that the coolant jets adhere to the hot surface rather than collide and mix with the primary flowpath C.

In alternate examples using dimples in place of the illustrated trough, each dimple is placed over a single film hole 130 or slot 132, and provides substantially the same features as the illustrated depression 120.

In the examples illustrated in FIGS. 2A and 2B, the depression 120 includes portions 127 that extend beyond the film holes 130 or slots 132, and portions 128 between the film holes 130 or slots 132. In the portions 127, 128 of the depression 120 without a film hole 130 or slot 132, fluid traveling through the primary flowpath C enters the depression 120 via the descending flank 122, and then exits the trough via the ascending flank 128. Due to the absence of a film hole 130 or slot 132, the fluid flowing through the depression 120 in these portions 127, 128 is projected outward into the primary flowpatch C creating a haystack effect. The haystack effect reduces the efficiency of the fluid flow through the primary flowpath and negatively impacts the cooling ability of the blade 100.

Figure 3:
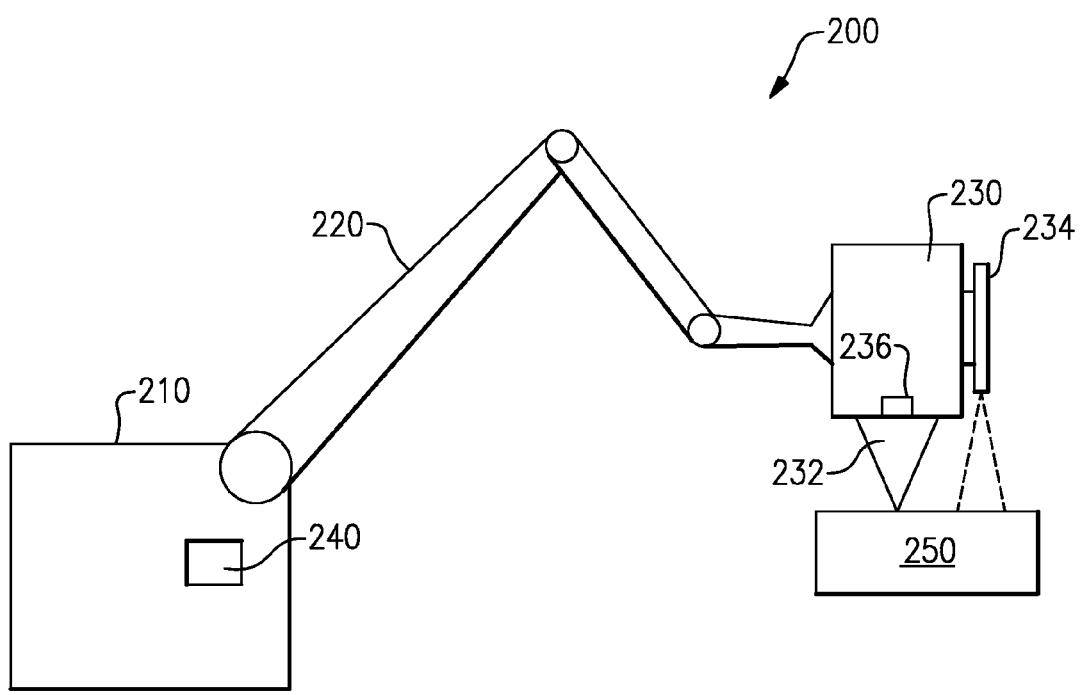
FIG. 3 schematically illustrates a machining apparatus.
Figure 4:
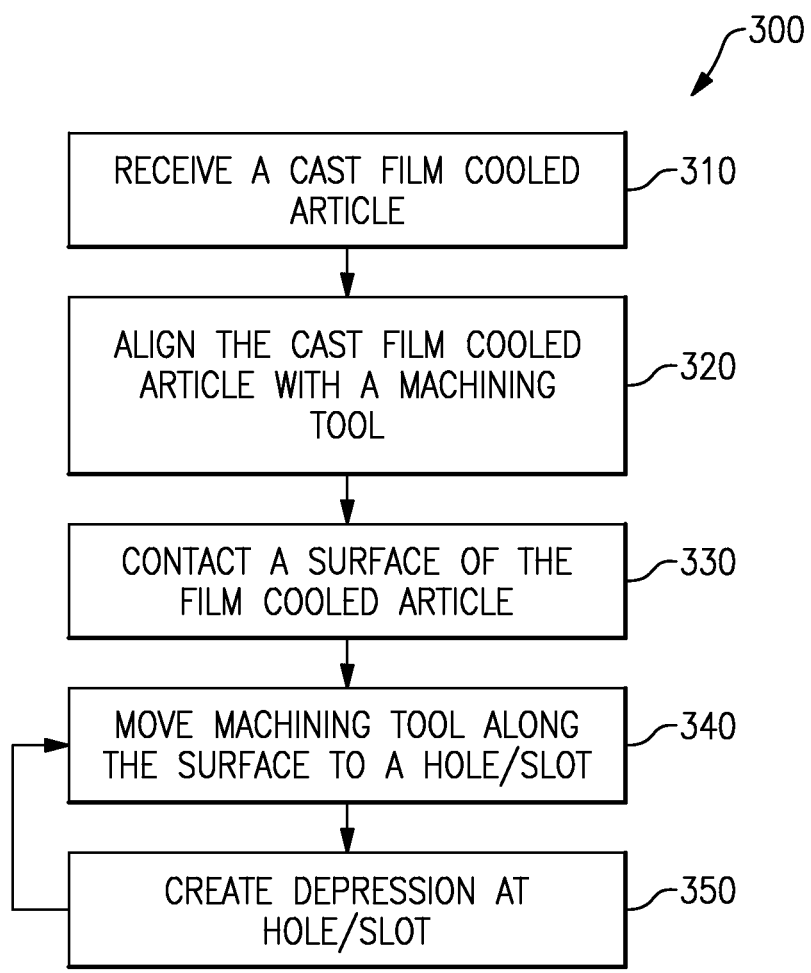
FIG. 4 illustrates a process for finishing a film cooled article.

While generally undesirable, the portions 127, 128 of the depression 120 not aligned with a film hole 130 or slot 132 are unavoidable in previous manufacturing techniques due to machining tolerances and requirements. In order to reduce or eliminate the negative impact, the automatic machining technique disclosed herein, with regards to FIGS. 3 and 4, is utilized to create a depression 120 that is only aligned with the film holes 130 or slots 132, and omit the portions 127, 128 of the depression 120 that are not aligned with a film hole 130 or slot 132. That is to say, in the finishing process, no material is removed from exterior surface of the airfoil other than material aligned with the film hole 130 or the slot 132, thereby eliminating the extra portions 127, 128 of the depression 120. This reduces or eliminates the haystack effect described above and improves the film cooling abilities of the film cooled article.

With continued reference to FIG. 2, FIG. 3 schematically illustrates a machining apparatus 200 for machining the depression 120 into a cast film cooled article, such as the film cooled blades 100 described above. The machining apparatus 200 includes a central control machine 210 with an articulating arm 220 extending therefrom. Attached to the end of the articulating arm 220 is a machining tool 230. The machining tool 230 includes a machining element 232 that capable of removing material from the cast film cooled article 250 according to any known material removal technique. The machining tool 230 further includes a touch sensor 236 operable to detect when the machining tool 230 is in contact with the film cooled article 250, and a visual sensor 234 operable to provide a visual depiction of the film cooled article 250 being finished.

By way of example the touch sensor 236 can be pressure based, capacitive based, resistive based, or any combination of the above sensing techniques. Furthermore, any alternate touch sensing technique can be utilized instead of, or in conjunction with, the previously described touch sensing techniques and provide similar benefits. Similarly, the visual sensor 234 can be any visual sensor capable of providing a detailed visual determination of the film cooled article 250 as the article is being finished.

Each of the sensors 234, 236 provide the sensed information to an electronic controller 240 within the control machine 210. The electronic controller 240 uses a combination of the sensor information to ensure that direct contact between the machining tool 230 and the film cooled article 250 being finished is maintained at all times in the finishing process. The visual sensor 234 and the touch sensor 236 are further used by the electronic controller 240 to identify the actual position of the film holes 130 or slots 132 in real time, rather than relying on pre-programmed or expected positions that must account for casting tolerances. By maintaining contact with the article, repositioning of the machining tool 230 is minimized, and material can be removed at only the desired locations. This, in turn, reduces the tolerances on the machining process being utilized to create the depression 120 at the film holes 130 or slots 132.

While illustrated herein as a single control machine 210 utilizing a single articulating arm 220, one of skill in the art having the benefit of this disclosure will appreciate that the control machine 210 can utilize any number of articulating device to precisely control the position of the machining tool 230 based on the sensory inputs of the visual sensor 234 and the touch sensor 236.

With continued reference to FIGS. 2 and 3, FIG. 4 illustrates a process 300 for finishing a film cooled article, such as the turbine blades 100 illustrated in FIG. 2A and 2B. Initially, a worker receives the unfinished film cooled article in a "receive a cast film cooled article" step 310. The cast film cooled article is cast with the interior plenums and the film holes 130 or slots 132 connecting the interior cooling plenums to the exterior surface of the film cooled article. Due to natural and unavoidable variances and tolerances in the casting process, the holes 130 or slots 132 will not be in the exact same location each cast, even if an identical mold or casting technique is used. The worker then mounts the film cooled article 250 to a machining apparatus, such as the machining apparatus 200 illustrated in FIG. 3.

Once mounted, the machining tool 230 of the machining apparatus 200 is aligned with the cast film cooled article in an "align the cast film cooled article with a machining tool" step 320. The alignment can be done manually by the worker mounting the film cooled article 250, or automatically by a controller 240 after the film cooled article has been mounted. During the aligning, the machining tool 230 is brought near the unfinished film cooled article but not brought into contact with the film cooled article.

Once aligned, the controller 240 of the machining apparatus 200 takes over and places the machining element 232 in contact with the exterior surface of the cast film cooled article 250 in a "contact a surface of the film cooled article" 330. The machining apparatus 200 can detect when contact is made with the film cooled article 250 either using a touch sensor 236 to detect contact or a visual sensor 234 to detect a distance between the machining tool 230 and the cast film cooled article 250. In alternate examples, this detection can be made using a combination of both sensor outputs. In either example, the contact determination is made in real time, as the machining tool 230 contacts the cast film cooled article 250.

Once initial contact has been made between the machining tool 230 and the cast film cooled article, the machining tool 230 is moved along the surface of the cast film cooled article 250 to a film hole 130 or slot 132 in a "move machining tool along the surface to a hole/slot" step 340. During the movement, the controller 240 of the machining apparatus 200 utilizes sensory feedback from at least one of the touch sensor 236 and the visual sensor 234 to ensure that the machining tool 230 remains in contact with the surface of the cast film cooled article.

The controller 240 also uses the sensory feedback to determine the presence and exact location of a hole 130 or slot 132 at which a depression 120 needs to be machined out of the cast film cooled article. As with the contact sensing, the exact location of a hole 130 or slot 132 can be determined based on the touch sensor 236 or the visual sensor 234, thereby enabling precise positioning of the machining element 232, and allowing the depression 120 to be created only at the location of the film hole 130 or slot 132.

Once the precise location of the film hole 130 or slot 132 has been identified, the machining tool 230 removes material from the surface of the cast film cooled article at the film hole 130 or slot 132 in a "create depression at hole/slot" step 350. During the machining process, the touch sensor 236, the visual sensor 234, or a combination of the two, are used to ensure, in real time, that material is only removed at the hole 130 or slot 132. The real time monitoring by the controller 240 prevents creation of the excess portions 127, 128, described above with regards to the examples of FIGS. 2A and 2B.

Once the depression 120 has been created, the process 300 returns to the move machining tool along the surface to a hole/slot step 340 and the machining tool 230 is moved to the next film hole 130 or slot 132 in the manner described above.

In alternate examples, the controller 240 of the machining apparatus 200 can be programmed to with expected approximate hole locations, and determine the exact locations in real time. In yet further alternate example implementations, the controller 240 can be programmed to create depressions of varying depths depending on the particular design of a given film cooled article 250. In yet further alternate examples, the controller 240 can be programmed to skip certain film holes 130 or slots 132 where no depression is desired.

While described above with general regards to film cooled blades and vanes for a turbine section of a gas turbine, one of skill in the art having the benefit of this disclosure will understand that the manufacturing process and end article described above can be any film cooled article, and is not limited to a turbine stage blade or a turbine stage vane.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for finishing a film cooled article comprising:
providing a film cooled article including at least one inner cooling plenum and at least one opening connecting said inner cooling plenum to an exterior surface of the film cooled article;
positioning a machining element in contact with said exterior surface of the film cooled article;
automatically moving said machining element along said exterior surface while maintaining contact between the machining element and the surface;
identifying an actual position of at least one film opening based on sensory feedback from the machining element using a controller while maintaining contact between the machining element and the surface; and
removing material from said exterior surface at said at least one film opening using said machining element, thereby creating a depression at said at least one film opening, wherein identifying the actual position of the at least one film opening based on sensory feedback from the machining element, and removing material from said exterior surface at said film opening using said machining element, thereby creating a depression at said film opening is repeated for a subset of a plurality film openings of said film cooled article.

2. The method of claim 1, wherein identifying the actual position of the at least one film opening based on sensory feedback from the machining element comprises interpreting sensor readings from at least one of a touch sensor apparatus and a visual sensor apparatus using the controller.

3. The method of claim 2, wherein identifying the actual position of the at least one film opening based on sensory feedback from the machining element comprises the controller interpreting sensor readings from a combination of a touch sensor apparatus and a visual sensor apparatus.

4. The method of claim 1, wherein automatically moving said machining element along said exterior surface while maintaining contact between the machining element and the surface comprises moving said machining element to an expected position of at least one film opening.

5. The method of claim 4, wherein identifying an actual position of at least one film opening based on sensory feedback from the machining element using a controller comprises identifying the expected position and identifying the actual position relative to the expected position.

6. The method of claim 1, wherein the film cooled article is a cast film cooled article.

7. The method of claim 1, wherein removing material from said exterior surface at said film opening using said machining element, thereby creating a depression at said film opening comprises removing material only at said film openings.

8. The method of claim 1, wherein removing material from said exterior surface at said film opening using said machining element, thereby creating a depression at said film opening comprises creating a depression only at said film opening.

9. A method for finishing a film cooled article comprising:
providing a film cooled article including at least one inner cooling plenum and at least one opening connecting said inner cooling plenum to an exterior surface of the film cooled article;
positioning a machining element in contact with said exterior surface of the film cooled article;
automatically moving said machining element along said exterior surface while maintaining contact between the machining element and the surface;
identifying an actual position of at least one film opening based on sensory feedback from the machining element using a controller while maintaining contact between the machining element and the surface; and
removing material from said exterior surface at said at least one film opening using said machining element, thereby creating a depression at said at least one film opening, wherein identifying the actual position of the at least one film opening based on sensory feedback from the machining element, and removing material from said exterior surface at said film opening using said machining element, thereby creating a depression at said film opening is repeated for each film opening of said film cooled article.

10. A method for finishing a film cooled article comprising:
providing a film cooled article including at least one inner cooling plenum and at least one opening connecting said inner cooling plenum to an exterior surface of the film cooled article;
positioning a machining element in contact with said exterior surface of the film cooled article;
automatically moving said machining element along said exterior surface while maintaining contact between the machining element and the surface;
identifying an actual position of at least one film opening based on sensory feedback from the machining element using a controller while maintaining contact between the machining element and the surface; and
removing material from said exterior surface at said at least one film opening using said machining element, thereby creating a depression at said at least one film opening, wherein identifying an actual position of at least one film opening based on sensory feedback from the machining element is performed by said controller in real time as said machining element is moved along the exterior surface.

* * * * *